UNITED STATES PATENT OFFICE.

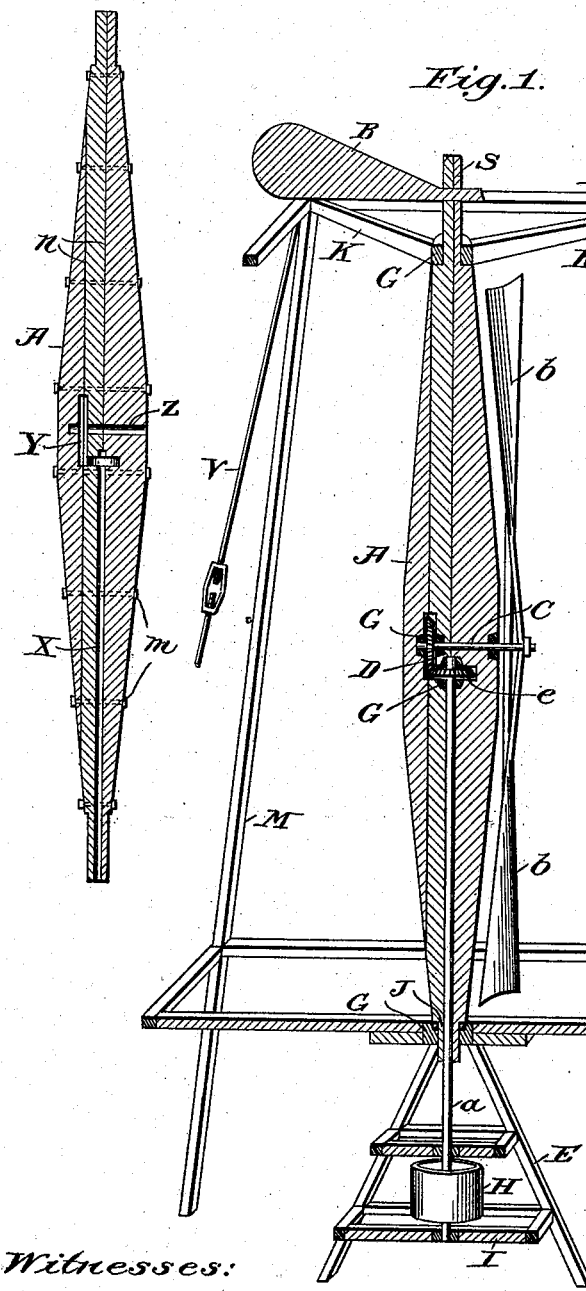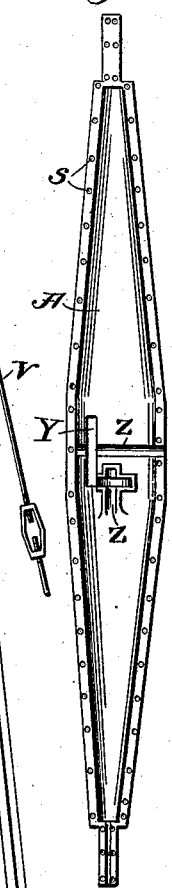

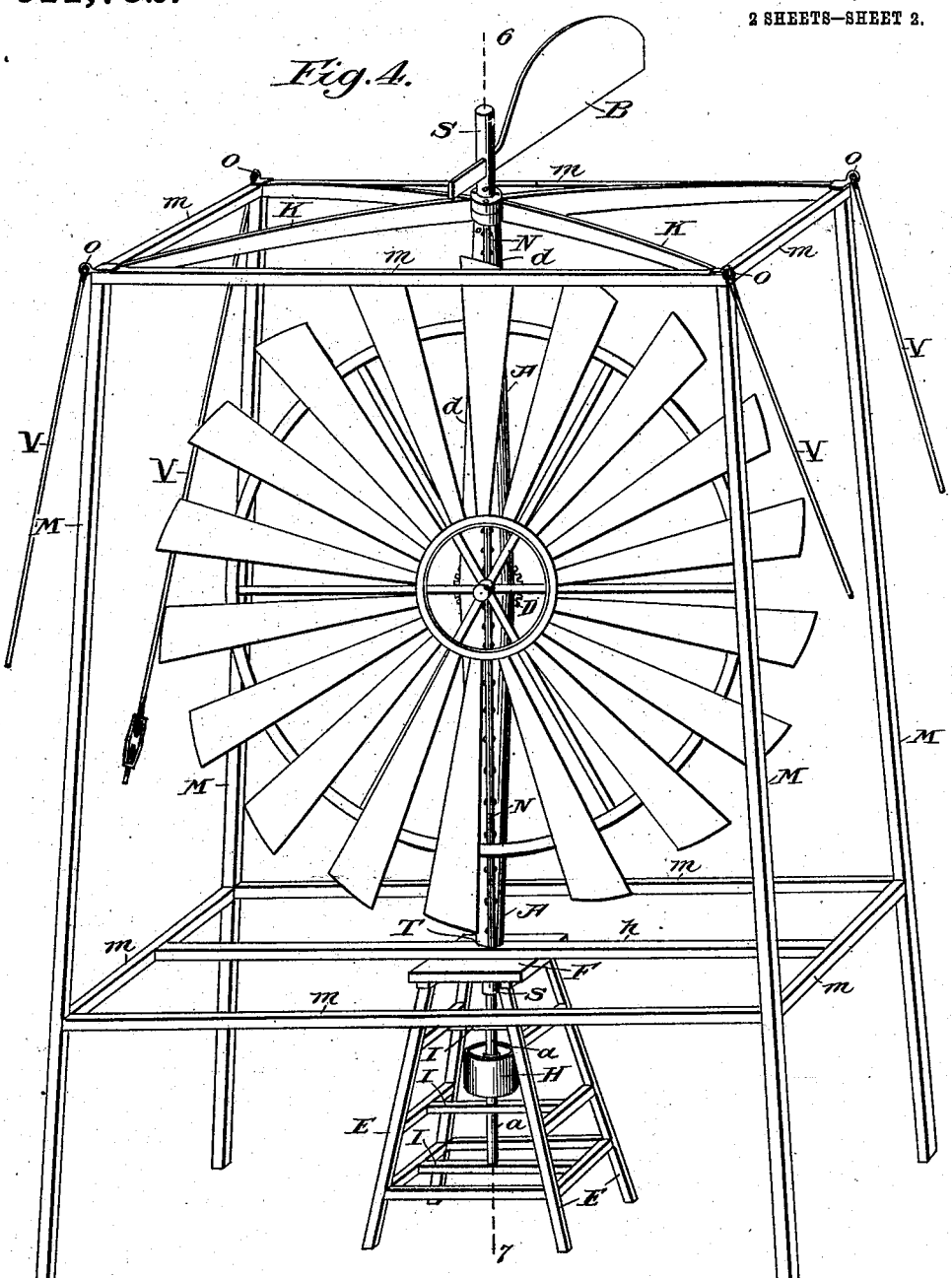

EDWARD TILEE PARKER, OF VERMILION PARISH, LOUISIANA.

WINDMILL.

No. 911,752.   Specification of Letters Patent.   Patented Feb. 9, 1909.

Application filed April 2, 1906. Serial No. 309,502.

*To all whom it may concern:*

Be it known that I, EDWARD TILEE PARKER, a citizen of the United States, residing in the parish of Vermilion and State of Louisiana, have invented new and useful Improvements in Windmills, of which the following is a specification.

This invention relates to improvements in that class of windmills in which a horizontally rotatable frame carries the wind wheel, vane, and main gearing, as contradistinguished from that class in which the wind wheel retains a fixed position regardless of the changes in the direction of the wind and the object of my invention is to provide an upper support for the mill, and render it possible to operate larger and more powerful wind mills. I attain this object by means of the combination of parts hereinafter described.

The inefficiency of wind mills as heretofore constructed is due to the fact that the frame carrying the wind wheel, vane, and main gearing is secured to the top of the tower and depends on the single tower for its support, which practically limits them to the use of wind wheels of small diameter that furnish little power.

By means of the additional tower as shown in the accompanying drawings it will be seen that it is possible to operate much larger and more powerful wind mills.

My invention consists essentially in the combination of an ordinary wind mill with an additional tower. This I have illustrated in the accompanying drawings in which—

Figure 1 represents a vertical section from front to rear, on the line 6. and 7. Fig. 4, of the wooden frame, the inner derrick or tower, the outer tower, the vane, and the wind wheel. Fig. 2. is a half of the frame when made of metal. Fig. 3. is a section of the frame when made of wood. Fig. 4. is a perspective view of the windmill as a whole and shows the two towers with the metal frame carrying the gearing of a windmill in place.

By means of the guy rods $v$ the mill may be properly adjusted and secured in its position. The vane B is attached to the upper extremity of the frame A and causes it to rotate in the usual manner.

In the drawings the reference character A, represents the frame, B, the vane, C, the wind wheel shaft, $e$, the cog wheel, on the driving shaft, G, the bearings, F, the top of the inner tower, $h$, the beams reinforcing the upper tower, H, the band wheel, $i$, braces in the inner tower, $a$, the driving shaft, $t$, the wind wheel, S, the neck or extensions, J, the shoulders of the frame, E, the inner derrick or tower, M, the additional or upper tower, $o, o$, rings for guy rods, $v$, sections of the guy rods, K, the crossed beams forming the top of the tower, Y, openings for the cog wheel, Z, raised portions forming bearings, A, Fig. 3, is the frame when made of wood, A, Fig. 2 half of the frame when made of metal.

It will be seen that my invention does not render unnecessary any of the parts heretofore used in the construction of wind mills, but is an addition thereto of an extra tower reinforced with guy rods, which enables it to withstand the pressure of the wind at its greatest velocity.

All of the parts shown or described are such as are commonly used and may be of any pattern desired and any system of gearing may be used, that shown in the drawings forming no part of my invention.

I am aware that prior to my invention wind mills have been made with rotatable frames operating in conjunction with a derrick or tower. I therefore do not claim such a combination broadly, but I am not aware that they have been operated in combination with an additional tower.

I therefore claim.

In a wind mill the combination of a prolonged, horizontally rotatable frame extending above, and below the wind wheel and above the upper tower M, and having a shoulder and a neck or extension at each end, with the tower E, having in its upper extremity an opening fitted with a suitable box or bearing, and with the upper tower M, having in its upper extremity an opening fitted with a suitable box or bearing, the said frame mounted on the said tower E, in the box or bearing therefor and rotatable therein, and secured to the tower M, in the box or bearing therefor and rotatable therein, substantially as described.

EDWARD TILEE PARKER.

Witnesses:
WILLIAM WALTON BIRLY,
JAMES ROBERT KITCHELL.